United States Patent
Dhruvakumar et al.

(10) Patent No.: US 11,372,667 B2
(45) Date of Patent: Jun. 28, 2022

(54) RESTORING THE STATE OF PAUSED VIRTUAL MACHINE ENVIRONMENTS WITH EXTERNAL ATTACHED VOLUMES

(71) Applicant: salesforce.com, inc., San Francisco, CA (US)

(72) Inventors: Srinivas Dhruvakumar, Vancouver (CA); Varun Gupta, Berkeley, CA (US); Kishore Sasidharan, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 178 days.

(21) Appl. No.: 16/773,463

(22) Filed: Jan. 27, 2020

(65) Prior Publication Data

US 2021/0232420 A1    Jul. 29, 2021

(51) Int. Cl.
*G06F 9/455* (2018.01)
*G06F 11/14* (2006.01)

(52) U.S. Cl.
CPC ...... *G06F 9/45558* (2013.01); *G06F 11/1464* (2013.01); *G06F 2009/45575* (2013.01); *G06F 2009/45579* (2013.01); *G06F 2201/84* (2013.01)

(58) Field of Classification Search
CPC ............ G06F 9/45558; G06F 11/1464; G06F 2201/84; G06F 2009/45579; G06F 2009/45575
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Dong U Kim
(74) *Attorney, Agent, or Firm* — Dergosits & Noah LLP; Todd A. Noah

(57) ABSTRACT

A system receives a pause request to pause a virtual environment that includes one or more virtual machines, each respective virtual machine having a mounting point connected to at least one corresponding block level storage volume. The system builds a model and a dependency graph of one or more components in the virtual environment. The system stores the model, the dependency graph and tags a snapshot of each corresponding block level storage volume. The system stops the one or more components in accordance with dependency logic of the dependency graph and stops the one or more virtual machines. The system builds the virtual environment and restarts the virtual machines in response to a resume request.

20 Claims, 8 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,019,180 B1 * | 7/2018 | Miah ................ G06F 3/065 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |
| 2015/0154046 A1 * | 6/2015 | Farkas ................ G06F 9/485 718/1 |
| 2015/0172563 A1 | 6/2015 | Jakobson et al. |
| 2016/0124665 A1 * | 5/2016 | Jain ................ G06F 11/1446 711/162 |
| 2020/0089574 A1 * | 3/2020 | Miah ................ G06F 16/285 |

\* cited by examiner

RESTORING THE STATE OF PAUSED VIRTUAL MACHINE ENVIRONMENTS WITH EXTERNAL ATTACHED VOLUMES

TECHNICAL FIELD

The present disclosure relates generally to the deployment of virtual environments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Virtual machines are a collection of system resources, such as CPU, networking and storage resources. Virtual machines use the collection of system resources to emulate a physical computing system. Hypervisor software running on a physical computing system allows a subset of system resources to be provisioned for use by a virtual machine. Hypervisor software can provision multiple subsets of system resources for use by multiple virtual machines. In cloud computing, virtual machine are executed by servers in a data center. Deployment of virtual machines in the cloud allows for many different types of applications and workloads to run and scale successfully. Cloud computing provides customers with the ability to pay for their dynamic computing needs as additional virtual machines can be instantiated to meet their growing demand for additional computing resources.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
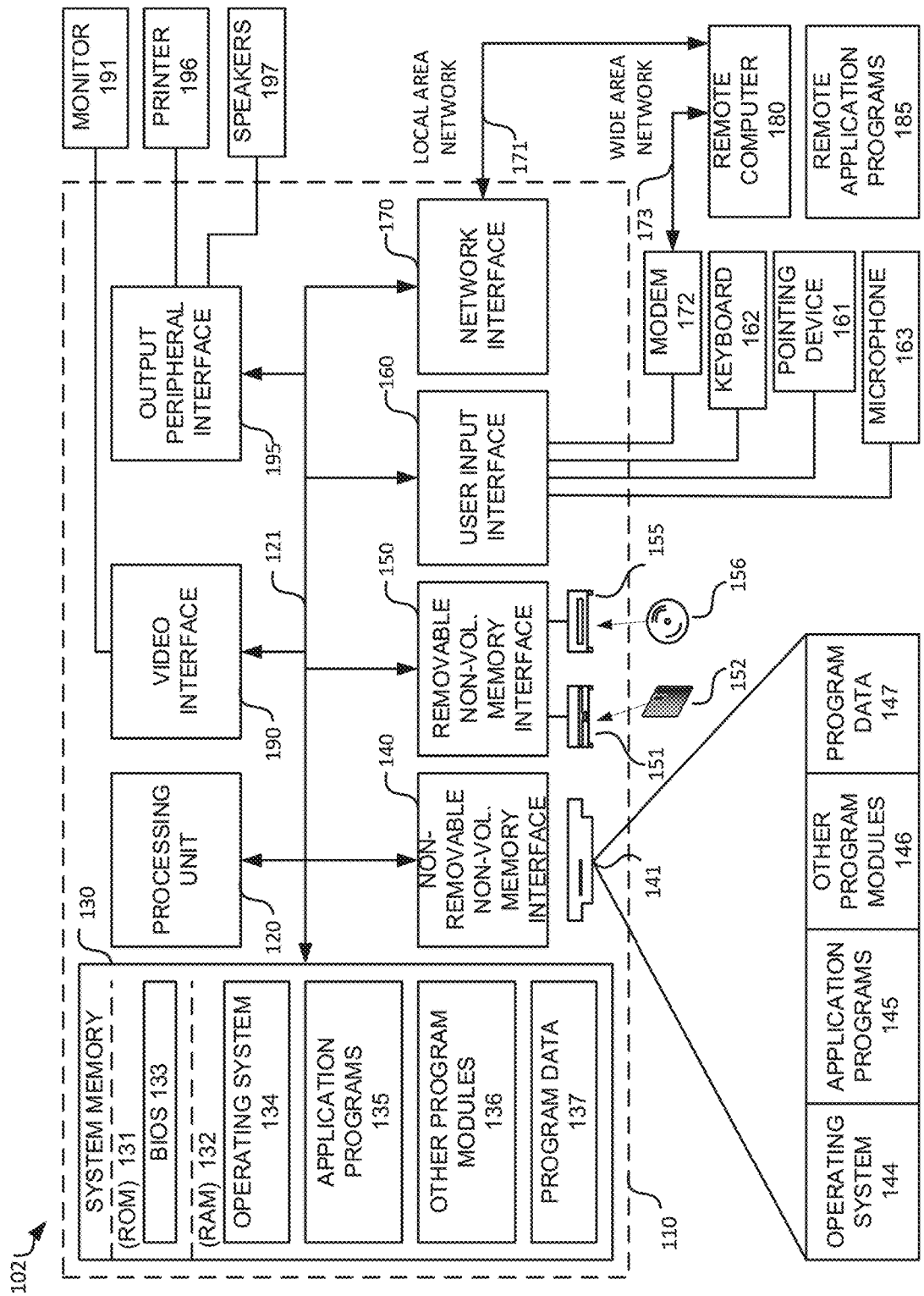
FIG. 1 shows a diagram of an example computing system that may be used with some embodiments.

In conventional systems, virtual environments often experience periods of time in which virtual machines are accessible but not actively being used by users of the virtual environments. Allowing a virtual machine to run while being inactive inevitably results in increased costs to the users. This may occur when a virtual machine has been provisioned to a user due to a temporary need for an increase in computing resources but the need has since subsided. While the user may no longer need the additional computing resources, the virtual machine provisioned to address the increased need may be still allocated to the user and thereby be included in the user's subscription pricing.

The increase in cost may motivate the users to terminate the unused virtual machines. However, terminating the unused virtual machines results in data loss. If a user later decides that a virtual machine needs to be used, then a new virtual machine has to be created which ties up system resources for virtual machine creation and thereby impacts the performance of applications and services in the virtual environment that also rely on the same system resources. In addition, redundancies are experienced when the user repopulates the data lost from virtual machine termination into the new virtual machine.

In accordance with embodiments described herein, there are provided methods, systems and computer program products for an Environment Manager to pause and resume stateful virtual machine environments. The Environment Manager backs-up the state and data of block level storage volumes by capturing a snapshot of each block level storage volume. By generating searchable snapshot tags and storing the snapshots and tags before block level storage volumes are deleted, the Environment Manager provides virtual environment users with the advantageous functionality of pausing and resuming virtual machines and thereby avoids the increased costs currently experienced by conventional systems. For example, the Environment Manager avoids the costs of running a virtual machine in a public cloud-based system, the costs of block level storage volumes attached to the virtual machines and load balancer application costs experienced by unused virtual machines.

Various embodiments of the Environment Manager thereby provide the ability to restore a virtual machine to a known state without having to maintain the virtual machine at state while it is not in use. By not having to maintain the virtual machine at state, the Environment Manager eliminates the costs of maintaining the idle virtual machine. The cost savings are substantial to users. Moreover, by providing the ability to pause and resume a virtual machine(s), the Environment Manager avoids the additional time and monetary costs incurred in conventional systems by returning a formerly terminated virtual machines back to its state.

In accordance with embodiments described herein, the Environment Manager receives a pause request to pause a virtual environment that includes one or more virtual machines, each respective virtual machine having a mounting point connected to at least one corresponding block level storage volume. The Environment Manager builds a model and a dependency graph of one or more components in the virtual environment. The Environment Manager stores the model, the dependency graph and a snapshot of each corresponding block level storage volume. The Environment Manager stops the one or more components in accordance with dependency logic of the dependency graph and stops the one or more virtual machines.

In accordance with embodiments described herein, the Environment Manager receives a resume request to restart the virtual environment. The Environment Manager builds the virtual environment according to the model by instantiating each component with stored component data. The Environment Manager creates one or more block level storage volumes based on the stored snapshots. The Environment Manager restarts the stopped virtual machines associated with the virtual environment. The Environment Manager attaches the created block level storage volumes to mounting points of the restarted virtual machines. The Environment Manager restarts the instantiated components according to the dependency graph.

According to an embodiment, a virtual environment may be a wrapper for services running in a public cloud computing system(s). The virtual environment may contain one or more cloud resources in use and the type(s) of running applications. Information indicating the one or more block level storage volumes attached to or in use by the cloud resources are stored as well. The virtual environment contains, for each application, configuration data, start and stop instructions, and a dependency mapping data. In one embodiment, a block level storage volume may be an external hard drive associated with a virtual machine that stores raw and unformatted data. In another embodiment, a block level storage volume may be a virtualized hard disk associated with a virtual machine.

While one or more implementations and techniques are described herein as implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
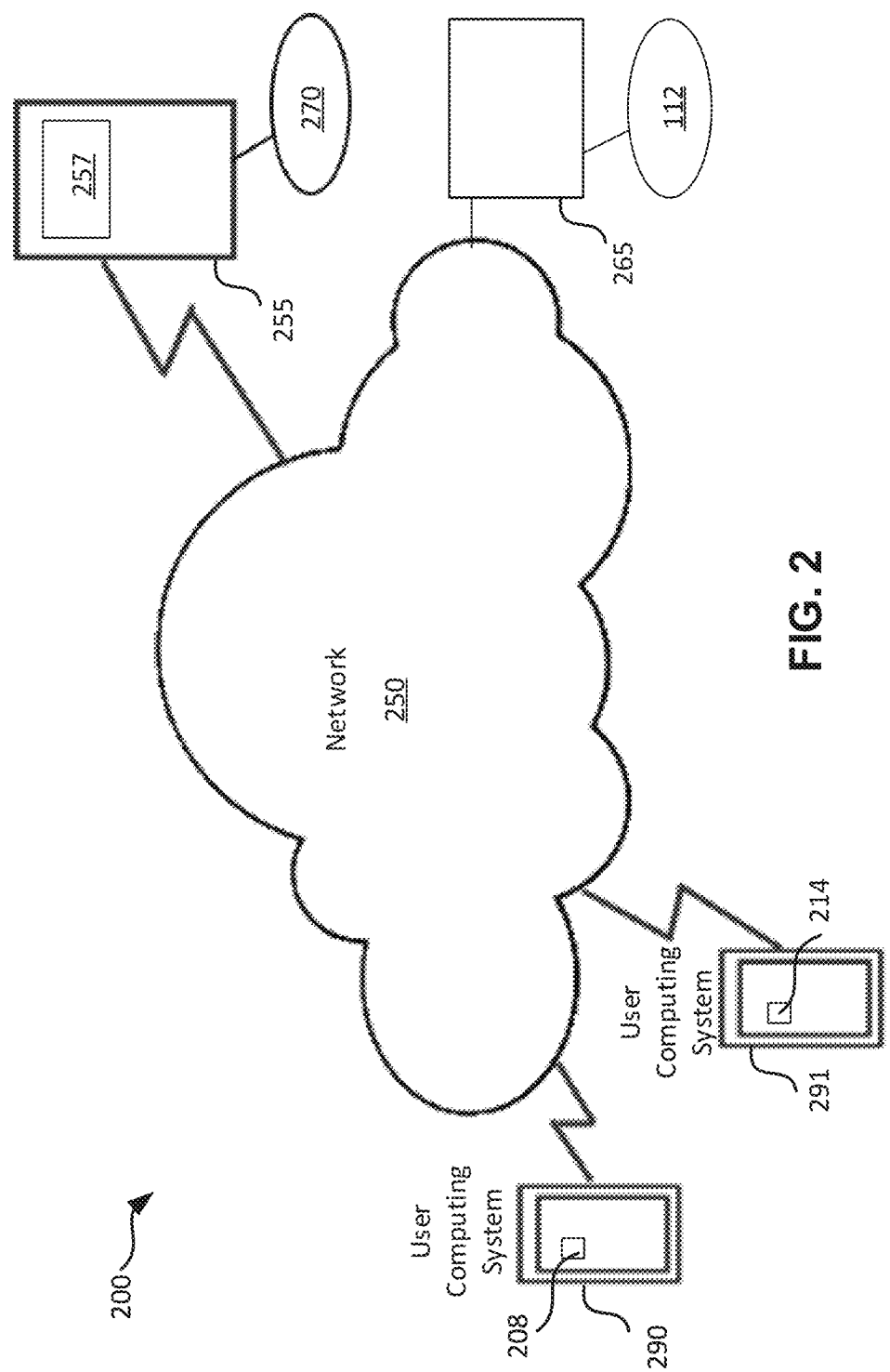
FIG. 2 shows a diagram of an example network environment that may be used with some embodiments.

FIG. 2 shows a diagram of an example network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 and 265 via the network 250.

Each of the computing systems 290 and 291 may include an application module such as module 208 or 214. For example, a user (e.g., a developer) may use the computing system 290 and the application module 208 to connect to and communicate with the server computing system 255 and log into application 257 (e.g., a Salesforce.com® application).

For some embodiments, the user may use the application 257 to develop, manage, install and execute a software package(s) for pausing and resuming virtual environments and one or more of pre-processing and post-processing customized codes related to development, management, installation and execution of the software package(s). The pre-processing and post-processing customized codes may be executed by the server computing system 255. The development, management, installation and execution (or portions thereof) may be executed by the server computing system 265 associated with the server computing system 255. The server 265 may be associated with database 112. For example, the server computing system 265 may be configured to develop, manage, install and execute a software package(s) using a product of Salesforce.com.

Figure 3A:
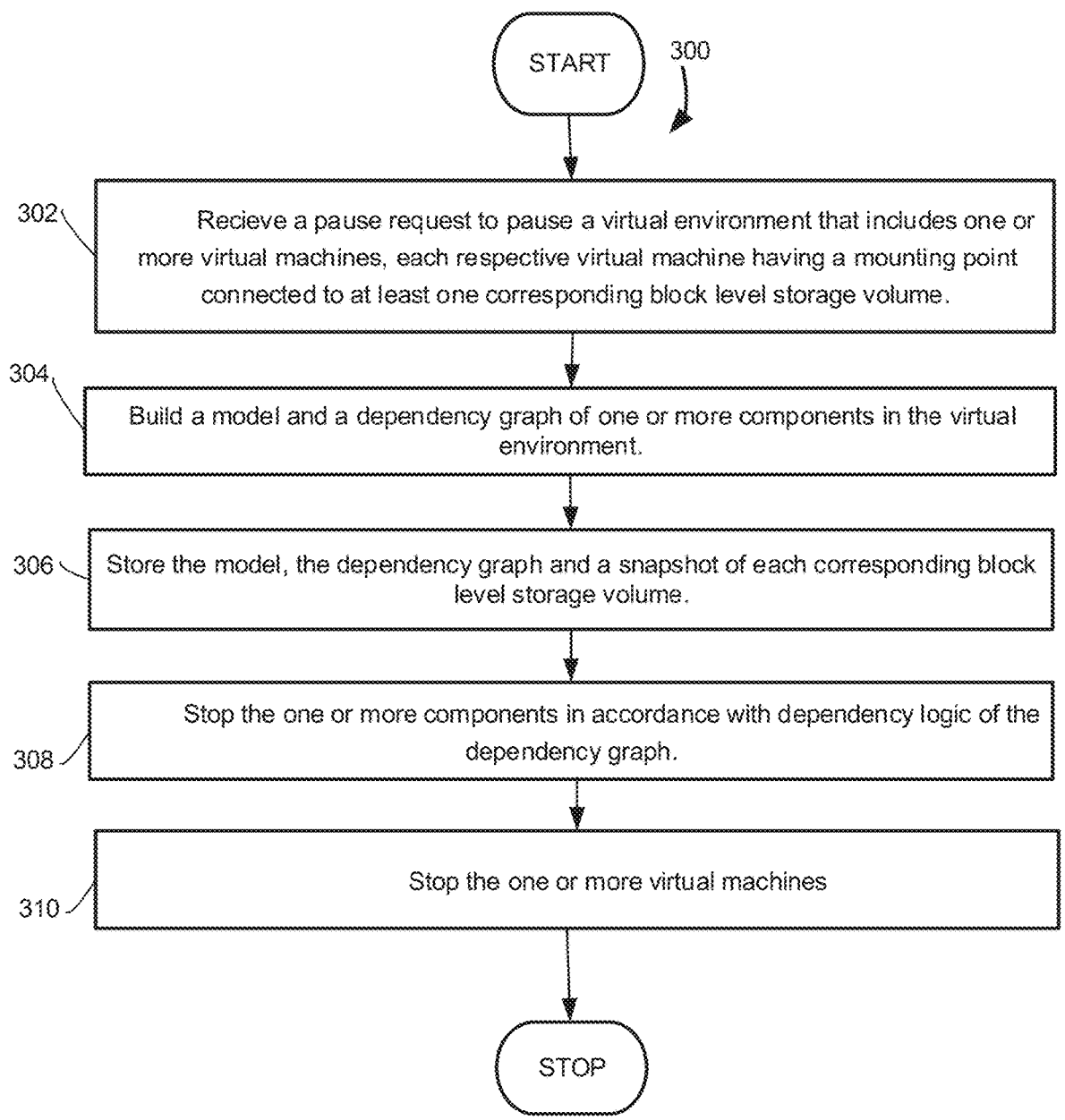
FIG. 3A is an operational flow diagram illustrating a high-level overview of a method for pausing a virtual environment, in an embodiment.

FIG. 3A is an operational flow diagram illustrating a high-level overview of a method 300 for pausing a virtual environment, in an embodiment.

At step 302, the Environment Manager receives a pause request to pause a virtual environment that includes one or more virtual machines. Each respective virtual machine having a mounting point connected to at least one corresponding block level storage volume. For example, a first virtual machine may have a mounting point that is connected to a plurality of block level storage volumes. The pause request may be sent from a first user of the virtual environment. The first user accesses an account of a multi-tenant database system which hosts the virtual environment.

At step 304, the Environment Manager builds a model and a dependency graph of one or more components in the virtual environment, such as resources, applications and services. For example, the virtual environment may be a cloud-based system that runs (executes) one or more services. The virtual environment may contain one or more resources and may have various of types of applications. For example, resources may be the virtual machines, load balancers and block storage. The Environment Manager builds a model that represents the resources, services and applications.

The Environment Manager builds a dependency graph for the virtual environment. To build the dependency graph, the Environment Manager determines which resources, applications and/or services depend on data and/or functionality of other resources, applications and/or services of the virtual environment. The Environment Manager generates dependency logic indicating restart priorities such that dependent resources, applications and/or services are restarted after the respective resources, applications and/or services upon which they rely are restarted. Similarly, the Environment Manager generates dependency logic indicating stop priorities such that dependent resources, applications and/or services are stopped before the respective resources, applications and/or services upon which they rely are stopped.

For example, runtime state dependency logic of the dependency graph may indicate that a service that stores environment state information will have to be restarted first since all other resources, applications and/or services of the virtual environment rely on the state information. A message bus may next be restarted followed by a mirror service that replicates data sent through the message bus. After the mirror service, a topics deployer service may be restarted for consuming and producing messages that are to be only available in a particular channel. A manager service may also then be restarted that allows for viewing of the virtual environment's topics, consumers, producers and state information. Application server(s) associated with the virtual environment will have to be restarted after a corresponding database server(s).

At step 306, the Environment Manager stores the model, the dependency graph and a snapshot of each corresponding block level storage volume. Each snapshot represents a state of a block level storage volume that has been detached from a mounting point of a corresponding virtual machine. The Environment Manager stores the components of the virtual environment for later access. Dependency mapping based on the run-time dependency logic for each component may be stored in relation to the respective stored component. In addition, stored components may be stored with a component identifier and an indication of type (such as resource type). The Environment Manager may generate tags for each snapshot that corresponds to a virtual machine(s). A tag may have one or more fields for an identifier of the corresponding virtual machine, an identifier of the virtual environment, a geographic region in which the virtual environment is deployed, an identifier of a user(s) that spawned the virtual environment, a name of application(s) hosted on the virtual machine and an indication of when the virtual machine is to expire (if the virtual machine is a temporary virtual machine). The Environment Manager may store the tags as well, such that the tags can be searched according to one or more queries in order to return search results that identify one or more snapshots.

At step 308, the Environment Manager stops the one or more components in accordance with dependency logic of the dependency graph and stops the one or more virtual machines (step 310). In addition, the Environment Manager may store each stopped virtual machine in relation to its respective virtual machine tag.

Figure 3B:
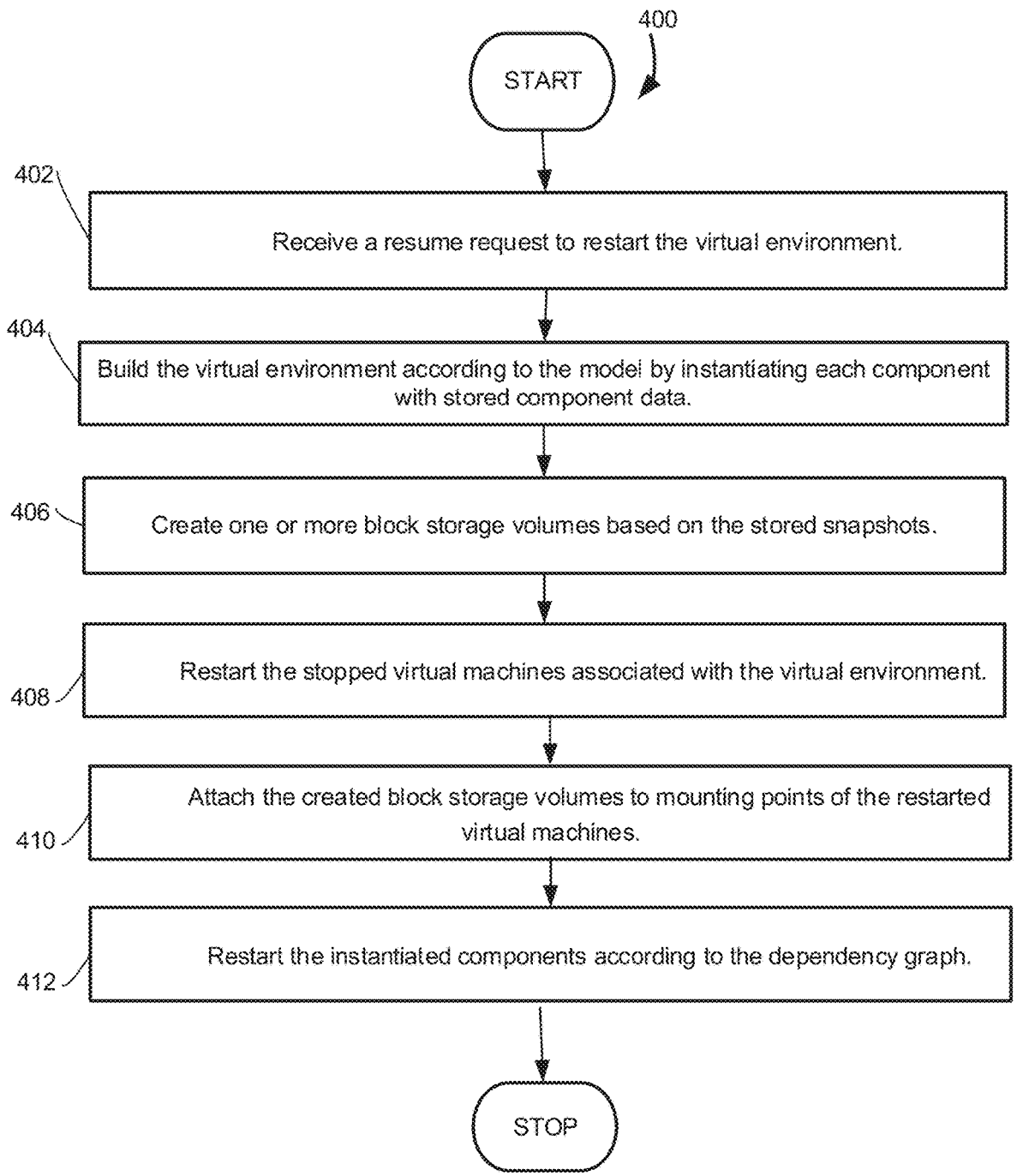
FIG. 3B is an operational flow diagram illustrating a high-level overview of a method for restarting a virtual environment, in an embodiment.

FIG. 3B is an operational flow diagram illustrating a high-level overview of a method 400 for restarting a virtual environment, in an embodiment.

At step 402, the Environment Manager receives a resume request to restart the virtual environment. For example, a user of a multi-tenant database system that hosts the virtual environment may initiate the resume request from an account associated with the multi-tenant database system. The user who sends the resume request may be the same user who previously sent the pause request. In another embodiment, the user who sends the resume request may be different than the user who sent the pause request, however both users have access to the virtual environment because both users are associated with a same organization object as defined within the multi-tenant database system.

At step 404, the Environment Manager builds the virtual environment according to the model by instantiating each component with stored component data. The Environment Manager retrieves the stored model of the virtual environment. For the example, the stored model may be located in a storage location determined by the multi-tenant database system in relation to an organization object. The stored model represents resources, services and applications (i.e. components) and state and data of the resources, services and applications when the model was built in response to the pause request. The Environment Manager may also access the stored dependency graph. The Environment Manager may fetch components represented in the stored model according to respective tags of the components. For example, the Environment Manager may send a query for components having tags that include information associated with the virtual environment and the pause request.

At step 406, the Environment Manager creates one or more block level storage volumes based on the stored snapshots. The Environment Manager may provision one or more block level storage volumes to be deployed for the newly-built virtual environment. In one embodiment, the stored model may include information indicating how many block level storage volumes where connected to virtual machines when the pause request was received. The Environment Manager may provision that same amount of block level storage volumes that were deployed in the virtual environment when the pause request was received.

At step 408, the Environment Manager restarts the stopped virtual machines associated with the virtual environment. The Environment Manager queries for tags of virtual machines. The queries may be based on field names of a virtual machine tag. For example, the Environment Manager may query for virtual machine tags with field data that includes an identifier of the virtual machine environment. The virtual machines are identified in the search results responsive to the query for virtual machine tags. The Environment Manager retrieves the identified, stopped virtual machines from storage of the multi-tenant database system.

At step 410, the Environment Manager attaches the created block level storage volumes to mounting points of the restarted virtual machines. Each restarted virtual machine has a mounting access point, which can be connected to a plurality of the restarted virtual machines. That is, in one embodiment, each restarted virtual machine may have its own mounting point that is connected to a unique set of a plurality of restarted virtual machines that have been restarted according to a state and data present when the respective virtual machines were paused.

Once the restarted virtual machines have been mounted to the mounting points of the restarted virtual machines, the Environment Manager restarts the instantiated components according to the dependency graph (step 412). In one embodiment, various components may be restarted before other dependent components in accordance to dependency logic in the stored dependency graph.

Figure 4A:
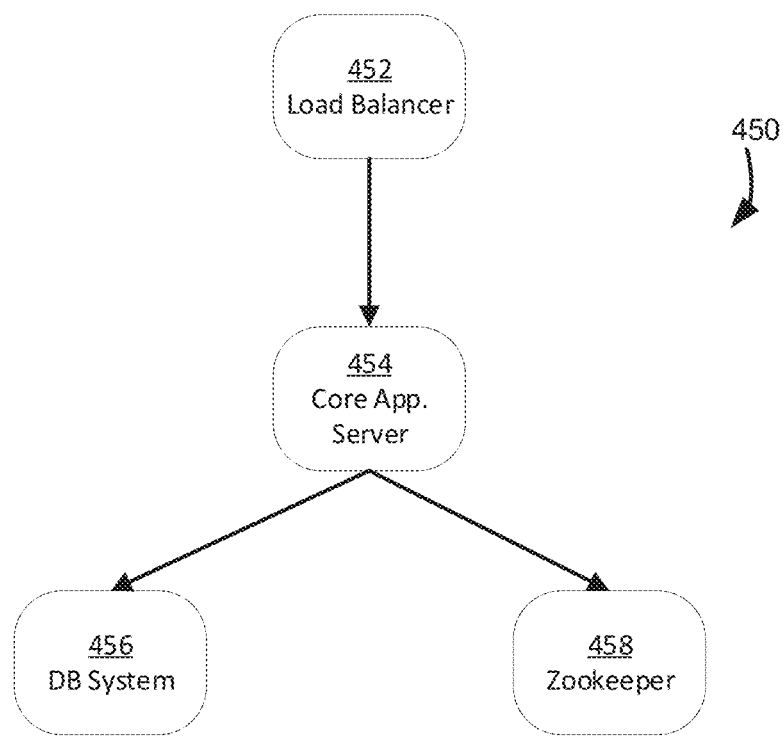
FIGS. 4A-B illustrate diagrams of dependencies, in an embodiment

As shown in FIG. 4A, a dependency graph 450 of various components of an environment illustrates a load balancer 452 that depends on a core application server 454. The core application server 454 depends on a database system 456 and a zookeeper service 458. For example, the load balancer 452 may be a device that acts as a reverse proxy and distributes network or application traffic across a number of servers. The core application server 454 may be an application provided by a multi-tenant database system. The database system 456 may be a proprietary multi-model database management system developed by a $3^{rd}$ Party. The zookeeper service 458 may be a centralized for maintaining configuration and naming information, providing distributed synchronization and providing group services. In order for the Environment Manager to restart the environment in accordance with the dependency graph 450, the Environment Manager starts the database system 456 and the zookeeper service 458 prior to starting the core application server 454. After starting the core application server 454, the Environment Manager starts the load balancer 452. It follows then, in order for the Environment Manager to stop the environment in accordance with the dependency graph 450, the Environment Manager stops the load balancer 452 and then stops the core application server 454. After stopping the core application server 454, the Environment Manager stops the zookeeper service 458 and the database system 456.

Figure 4B:
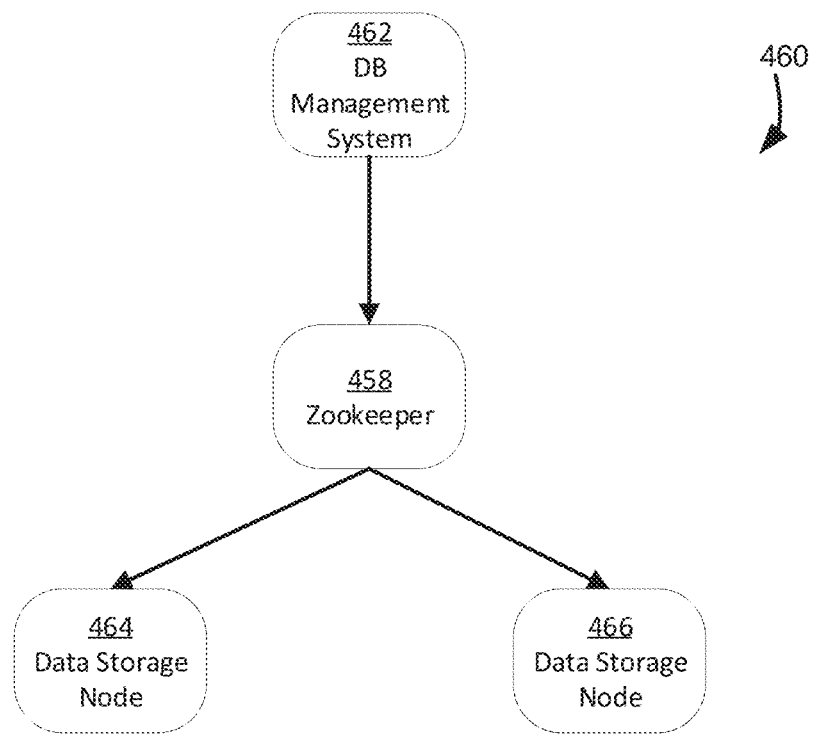

As shown in FIG. 4B, a dependency graph 460 illustrates a proprietary multi-model database management system 462, developed by another $3^{rd}$ Party, that depends on the zookeeper service 458. The zookeeper service 458 depends on nodes 464, 466 for storing data. In order for the Environment Manager to restart the environment in accordance with the dependency graph 460, the Environment Manager starts the nodes 464, 466 prior to starting the zookeeper service 458. After starting the zookeeper service 458, the Environment Manager starts the multi-model database management system 462. It follows then, in order for the Environment Manager to stop the environment in accordance with the dependency graph 460, the Environment Manager stops the database management system 462 and then stops the zookeeper service 458. After stopping the zookeeper service 458, the Environment Manager stops the nodes 464, 466. It is understood that the graphs 450, 460 of FIGS. 4A-B may each be representative of respective portions of the same dependency graph for all the services, applications and components of a environment(s).

Figure 5:
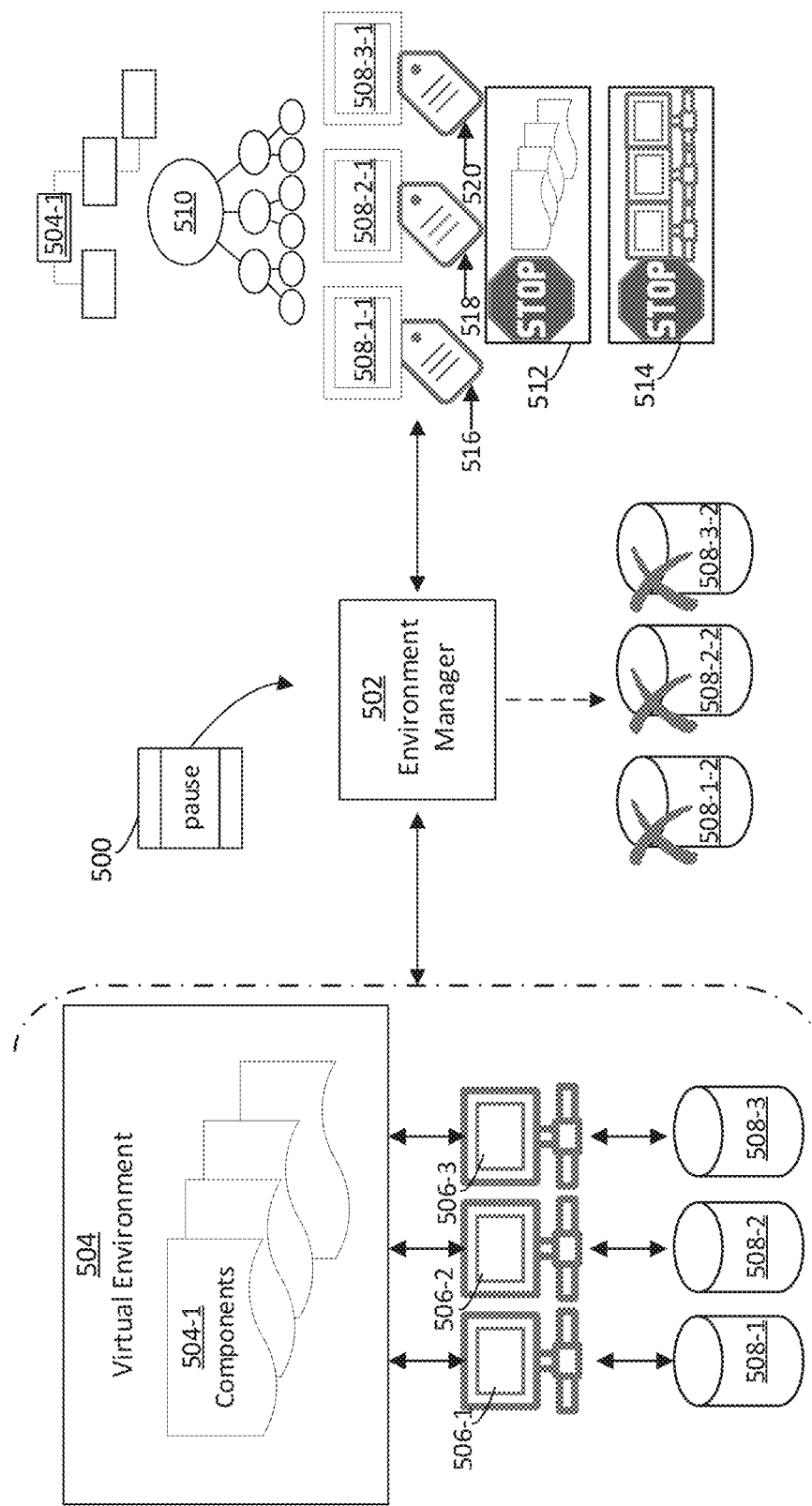
FIG. 5 is a high-level diagram for pausing a virtual environment, in an embodiment.

As shown in FIG. 5, according to one embodiment, a first user may send a pause request 500 from a first user account of a multi-tenant database system. The pause request 500 includes an identification of a virtual environment 504 associated with a particular organization object of a multi-tenant database system that hosts the virtual environment 504. The first user account is associated with the particular organization object. In response to the pause request 500, the Environment Manager 502 stores a model 504-1 of the virtual environment 504 and a dependency graph 510 of the virtual environment 504 in a multi-tenant database system memory location(s), such as one or more databases. The Environment Manager 502 stops the components 504-1 of the virtual environment 504 according to dependency logic of the dependency graph 510. The stopped components 514 are stored in a multi-tenant database system memory location(s).

The Environment Manager identifies one or more block level storage volumes 508-1, 508-2, 508-3 currently attached to virtual machines 506-1, 506-2, 506-3 of the virtual environment 504. Each block level storage volume 508-1, 508-2, 508-3 is detached from a corresponding virtual machine 506-1, 506-2, 506-3. Upon detaching the block level storage volumes 508-1, 508-2, 508-3, the Environment Manager 502 stops the virtual machines 506-1, 506-2, 506-3 and stores the stopped virtual machines 514 in a multi-tenant database system memory location(s).

The Environment Manager 502 captures a snapshot 508-1-1, 508-2-1, 508-3-1 of each detached block storage level storage volume 508-1-2, 508-2-2, 508-3-2 to back-up the state and data of the corresponding detached block level storage volume. After capturing the snapshots, the Environment Manager 502 deletes the detached block level storage volumes 508-1-2, 508-2-2, 508-3-2.

In one embodiment, for each snapshot 508-1-1, 508-2-1, 508-3-1 of a detached block level storage volume, the Environment Manager 502 generates a snapshot tag 516, 518, 520 represented by an identification string. The identification string for the snapshot tag 516, 518, 520 may include one or more consecutives identifiers, such as an identifier of the corresponding block level storage volume, an identifier of the virtual environment, an identifier of a virtual machine to which the corresponding block level storage volume represented by the snapshot was connected, and block device mapping. The Environment Manager 502 creates an association between the snapshot tag 516, 518, 520 and the corresponding snapshot 508-1-1, 508-2-1, 508-3-1. Each corresponding association may act as a mapping between a stored snapshot tag to a particular stored snapshot. The Environment Manager 502 stores the snapshots 508-1-1, 508-2-1, 508-3-1, the snapshot tags 516, 518, 520 and the corresponding associations in a storage location(s) managed by a multi-tenant database system.

According to one embodiment, a second user may send a resume request from a second user account of the multi-tenant database system. The resume request includes an identification of the virtual environment 504 associated with the particular organization object. The second user account is also associated with the particular organization object and represents a user identity that is different than a user identity represented by the first user account associated with the particular organization object.

In response to the resume request, the Environment Manager 504 accesses the stored model 504-1 and the dependency graph 510 based on the information in the resume request that describes the virtual environment 504. The Environment Manager 502 builds the virtual environment based on the model 540-1. The Environment Manager 502 also sends a tag query based on the information in the resume request that describes the virtual environment 504. Snapshot tags 516, 518, 520 with at least a portion(s) of an identification string that matches the tag query may be returned in search results. The Environment Manager 502 may then identify the snapshots 508-1-1, 508-1-2, 508-3-1 that are identifiable in the search results of the tag query.

The Environment Manager 502 may create one or more block level storage volumes based on the identified stored snapshots 508-1-1, 508-1-2, 508-3-1 in the search results of the tag query. Since the stored snapshots 508-1-1, 508-1-2, 508-3-1 are backups of the state and data of previously detached and deleted block level storage volumes 508-1-2, 508-2-2, 508-3-2, the newly-created block level storage volumes will be copies of the deleted block level storage volumes 508-1-2, 508-2-2, 508-3-2.

The Environment Manager 502 may retrieve and restart the stopped virtual machines 514 after attaching the newly-created block level storage volumes to mounting points of the retrieved virtual machines. The Environment Manager 502 may the restart the stopped components 514 according to the dependency graph 510.

System Overview

Figure 6:
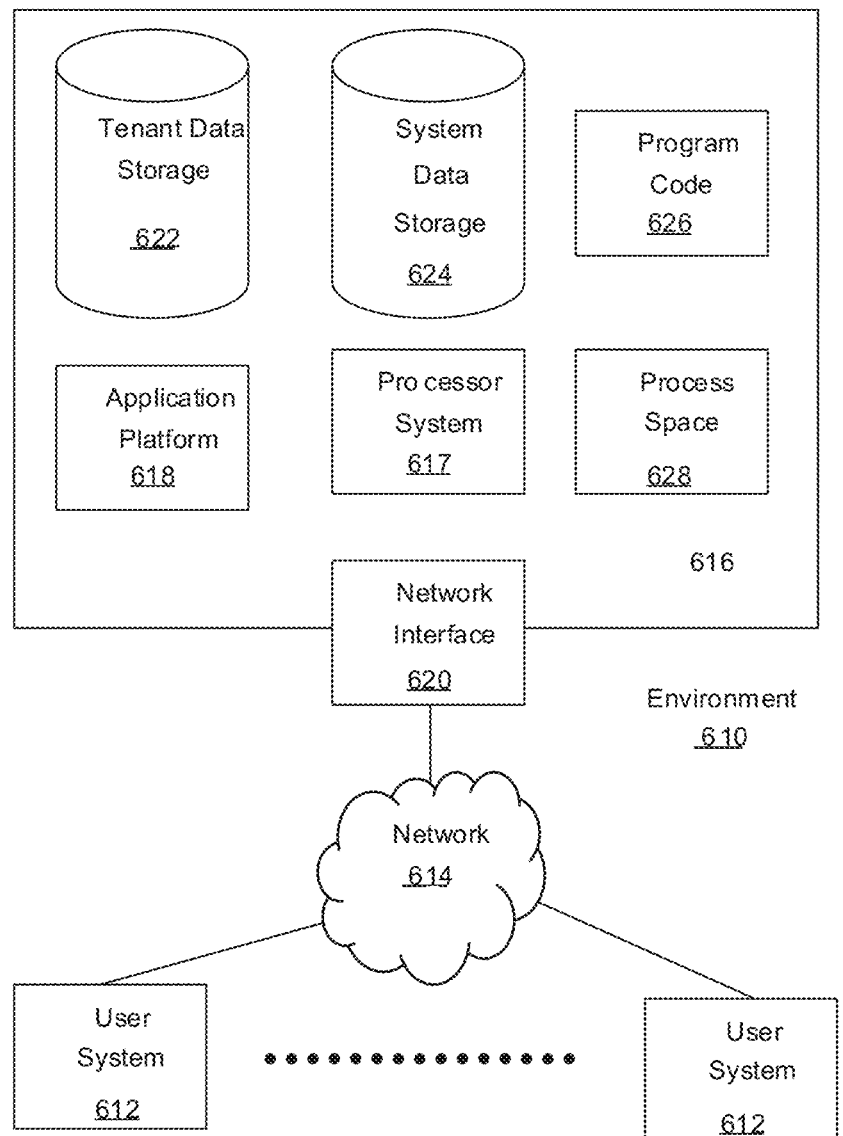

FIG. 6 illustrates a block diagram of an environment 610 wherein an on-demand database service might be used. The environment 610 may include user system(s) 612, a network 614, a system 616, a processor system 617, an application platform 618, a network interface 620, a tenant data storage 622, a system data storage 624, program code 626, and a process space 628. In other embodiments, the environment 610 may not have all of the components listed and/or may have other elements instead of, or in addition to, those listed above.

The environment 610 is an environment in which an on-demand database service exists. A user system 612 may be any machine or system that is used by a user to access a database user system. For example, any of the user systems 612 may be a hand-held computing device, a mobile phone, a laptop computer, a work station, and/or a network of computing devices. As illustrated in FIG. 6 (and in more detail in FIG. 7) the user systems 612 might interact via the network 614 with an on-demand database service, which is the system 616.

An on-demand database service, such as the system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 616" and the "system 616" will be used interchangeably herein. A database image may include one or more database objects. A relational database management system (RDMS) or the equivalent may execute storage and retrieval of information against the database object(s). The application platform 618 may be a framework that allows the applications of the system 616 to run, such as the hardware and/or software, e.g., the operating system. In an embodiment, the on-demand database service 616 may include the application platform 618 which enables creation, managing and executing one or more applications developed by the provider of the on-demand database service, users accessing the on-demand database service via user systems 612, or third-party application developers accessing the on-demand database service via the user systems 612.

The users of the user systems 612 may differ in their respective capacities, and the capacity of a particular user system 612 might be entirely determined by permissions (permission levels) for the current user. For example, where a salesperson is using a particular user system 612 to interact with the system 616, that user system 612 has the capacities allotted to that salesperson. However, while an administrator is using that user system 612 to interact with the system 616, that user system 612 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 614 is any network or combination of networks of devices that communicate with one another. For example, the network 614 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 612 might communicate with the system 616 using TCP/IP and, at a higher network level, use other common Internet protocols to communicate, such as HTTP, FTP, AFS, WAP, etc. In an example where HTTP is used, the user systems 612 might include an HTTP client commonly referred to as a "browser" for sending and receiving HTTP messages to and from an HTTP server at the system 616. Such an HTTP server might be implemented as the sole network interface between the system 616 and the network 614, but other techniques might be used as well or instead. In some implementations, the interface between the system 616 and the network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 616, shown in FIG. 6, implements a web-based customer relationship management (CRM) system. For example, in one embodiment, the system 616 includes application servers configured to implement and execute CRM software applications as well as provide related data, code, forms, webpages and other information to and from the user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 616 implements applications other than, or in addition to, a CRM application. For example, the system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of the system 616 is shown in FIG. 6, including the network interface 620, the application platform 618, the tenant data storage 622 for tenant data 623, the system data storage 624 for system data 625 accessible to the system 616 and possibly multiple tenants, the program code 626 for implementing various functions of the system 616, and the process space 628 for executing MTS system processes and tenant-specific processes, such as running applications as part of an application hosting service. Additional processes that may execute on the system 616 include database indexing processes.

Several elements in the system shown in FIG. 6 include conventional, well-known elements that are explained only briefly here. For example, each of the user systems 612 could include a desktop personal computer, workstation, laptop, PDA, cell phone, or any wireless access protocol (WAP) enabled device or any other computing device capable of interfacing directly or indirectly to the Internet or other network connection. Each of the user systems 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 612 to access, process and view information, pages and applications available to it from the system 616 over the network 614. Each of the user systems 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 616 or other systems or servers. For example, the user interface device may be used to access data and applications hosted by the system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 612 and all of its components are operator configurable using applications, such as a browser, including computer code run using a central processing unit such as an Intel Pentium® processor or the like. Similarly, the system 616 (and additional instances of an MTS, where more than one is present) and all of their components might be operator configurable using application(s) including computer code to run using a central processing unit such as the processor system 617, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 616 to intercommunicate and to process webpages, applications and other data and media content as described herein are preferably downloaded and stored on a hard disk, but the entire program code, or portions thereof, may also be stored in any other volatile or nonvolatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 616 is configured to provide webpages, forms, applications, data and media content to the user (client) systems 612 to support the access by the user systems 612 as tenants of the system 616. As such, the system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 7:
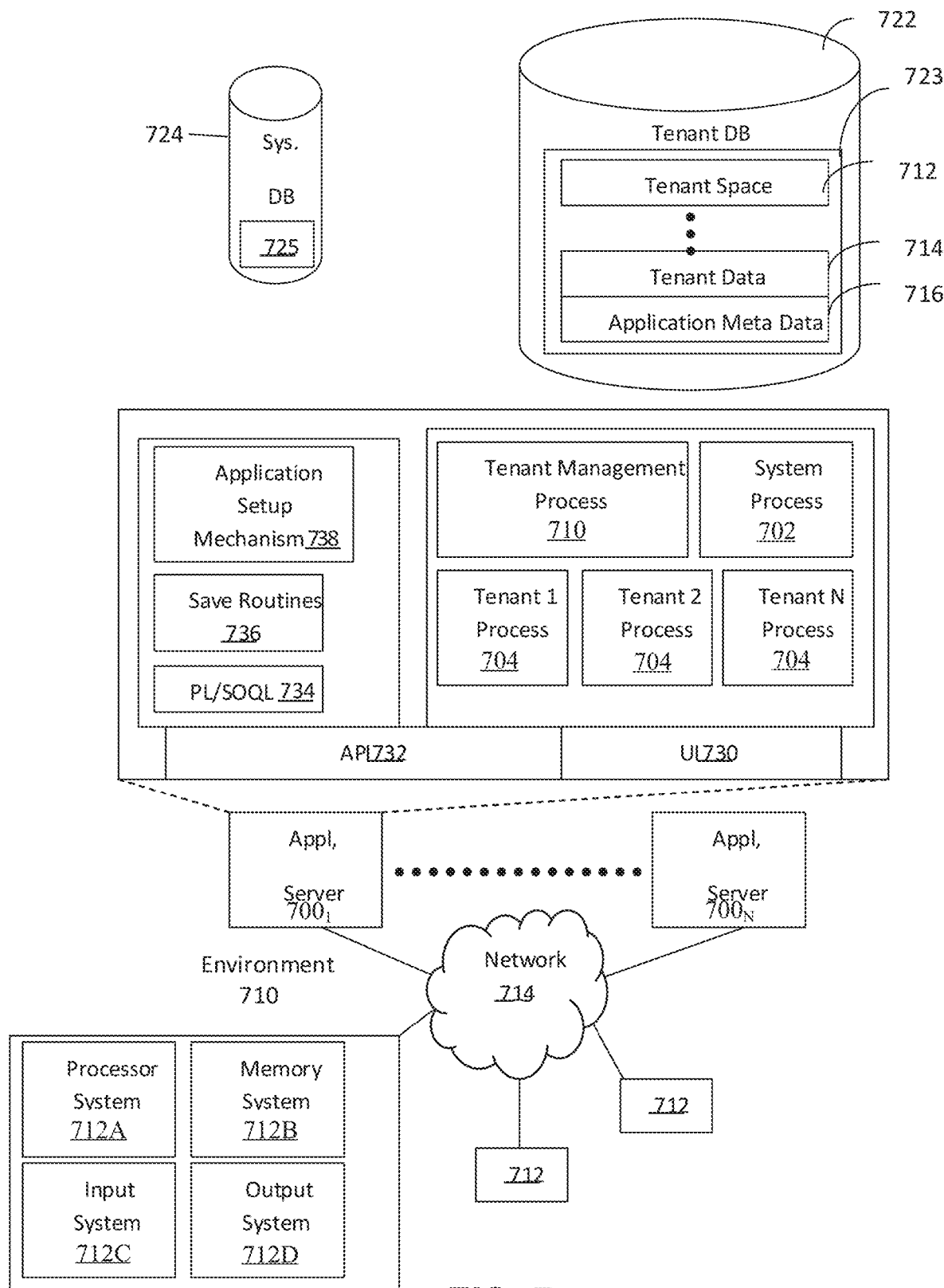
FIG. 7 illustrates a block diagram of an embodiment of elements of FIG. 6 and various possible interconnections between these elements.

FIG. 7 also illustrates the environment 710. However, in FIG. 7 elements of the system 616 and various interconnections in an embodiment are further illustrated. FIG. 7 shows that the each of the user systems 712 may include a processor system 712A, a memory system 712B, an input system 712C, and an output system 712D. FIG. 7 shows the network 714 and also shows that the system 616 may include the tenant data storage 722, the tenant data 723, the system data storage 724, the system data 725, a User Interface (UI) 730, an Application Program Interface (API) 732, a PL/SOQL 734, save routines 736, an application setup mechanism 738, applications servers $700_1$-$700_N$, a system process space 702, tenant process spaces 704, a tenant management process space 710, a tenant storage area 712, a user storage (or tenant data) 714, and application metadata 716. In other embodiments, the environment 710 may not have the same elements as those listed above and/or may have other elements instead of, or in addition to, those listed above.

The user systems 612, the network 614, the system 616, the tenant data storage 622, and the system data storage 624 were discussed above in FIG. 6. Regarding the user systems 712, the processor system 712A may be any combination of one or more processors. The memory system 712B may be any combination of one or more memory devices, short term, and/or long-term memory. The input system 712C may be any combination of input devices, such as one or more keyboards, mice, trackballs, scanners, cameras, and/or interfaces to networks. The output system 712D may be any combination of output devices, such as one or more monitors, printers, and/or interfaces to networks. As shown by FIG. 6, the system 616 may include the network interface 620 implemented as a set of HTTP application servers 700, the application platform 618, the tenant data storage 622, and the system data storage 624. Also shown is the system process space 702, including individual tenant process spaces 704 and the tenant management process space 710. Each application server 700 may be configured to access tenant data storage 622 and the tenant data 723 therein, and the system data storage 624 and the system data 725 therein to serve requests of the user systems 612. The tenant data 723 might be divided into individual tenant storage areas 712, which may be either a physical arrangement and/or a logical arrangement of data. Within each tenant storage area 712, the user storage 714 and the application metadata 716 might be similarly allocated for each user. For example, a copy of a user's most recently used (MRU) items might be stored to the user storage 714. Similarly, a copy of MRU items for an entire organization that is a tenant might be stored to the tenant storage area 712. The UI 730 provides a user interface and the API 732 provides an application programmer interface to the system 616 resident processes to users and/or developers at the user systems 612. The tenant data and the system data may be stored in various databases, such as one or more Oracle™ databases.

The application platform 618 includes the application setup mechanism 738 that supports application developers' creation and management of applications, which may be saved as metadata into the tenant data storage 622 by the save routines 736 for execution by subscribers as one or more tenant process spaces 704 managed by the tenant management process 710 for example. Invocations to such applications may be coded using the PL/SOQL 734 that provides a programming language style interface extension to the API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 716 for the subscriber making the invocation and executing the metadata as an application in a virtual machine.

Each application server 700 may be communicably coupled to database systems, e.g., having access to the system data 725 and the tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also may be used. For example, in certain embodiments, three consecutive requests from the same user could hit three different application servers 700, and three requests from different users could hit the same application server 700. In this manner, the system 616 is multi-tenant, wherein the system 616 handles storage of, and access to, different objects, data and applications across disparate users and organizations.

As an example of storage, one tenant might be a company that employs a sales force where each salesperson uses the system 616 to manage their sales process. Thus, a user might maintain contact data, leads data, customer follow-up data, performance data, goals and progress data, etc., all applicable to that user's personal sales process (e.g., in the tenant data storage 622). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 616 might also maintain system level data usable by multiple tenants or other data. Such system level data might include industry reports, news, postings, and the like that are sharable among tenants.

In certain embodiments, the user systems 612 (which may be client systems) communicate with the application servers 700 to request and update system-level and tenant-level data from the system 616 that may require sending one or more queries to the tenant data storage 622 and/or the system data storage 624. The system 616 (e.g., an application server 700 in the system 616) automatically generates one or more SQL statements (e.g., one or more SQL queries) that are designed to access the desired information. The system data storage 624 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
receiving a pause request from a system user to pause a virtual environment that includes one or more idling virtual machines, each respective virtual machine having a mounting point connected to at least one corresponding block level storage volume;
building a model and a dependency graph of components in the virtual environment in response to receiving the pause request;
storing the model, the dependency graph and a snapshot of each corresponding block level storage volume, which enables resuming the one or more idling virtual machines in the virtual environment;
stopping the components in accordance with dependency logic of the dependency graph; and
stopping the one or more idling virtual machines.

2. The method of claim 1, wherein building the dependency graph comprises:
determining a first component in the virtual environment relies on at least one of functionality and data of a second component in the virtual environment;
generating at least a first portion of the dependency logic indicating a restart priority of the second component being restarted before the first component; and
generating at least a second portion of the dependency logic indicating a stop priority of the first component being stopped before the second component.

3. The method of claim 1, wherein storing the snapshot of each corresponding block level storage volume comprises:
for each corresponding block level storage volume:
detaching the corresponding block level storage volume from a virtual machine mounting point;
capturing a snapshot of the detached corresponding block level storage volume to back-up a state and data of the block level storage volume;
tagging the captured snapshot;
deleting the detached corresponding block level storage volume; and
storing the tagged snapshot.

4. The method of claim 3, wherein tagging the captured snapshot comprises:
for each snapshot of a corresponding block level storage volume:
generating an identification string to represent a snapshot tag, the identification string indicating an identifier of the corresponding block level storage volume, an identifier of the virtual environment, an identifier of a virtual machine to which the corresponding block level storage volume was connected, and a block device mapping; and
creating an association between the identification string and the captured snapshot.

5. The method of claim 1 further comprising:
receiving a resume request to restart the virtual environment;
building the virtual environment according to the model by instantiating each component with stored component data;
creating one or more block level storage volumes based on the stored snapshots;
restarting the stopped virtual machines associated with the virtual environment;
attaching the created block level storage volumes to mounting points of the restarted virtual machines; and
restarting the instantiated components according to the dependency graph.

6. The method of claim 5, wherein creating one or more block level storage volumes based on the stored snapshots comprises:
identifying one or more stored snapshots based on one or more tag queries related to the virtual environment;
accessing one or more stored snapshots identified in search results of the one or more tag queries; and
creating the one or more block level storage volumes according to backed-up state and data represented in the one or more accessed stored snapshots.

7. The method of claim 5, further comprising:
wherein the pause request and the resume request are sent by one or more users that have access to the virtual environment and a multi-tenant database system, the virtual environment being hosted by the multi-tenant database system.

8. A computer program product comprising computer-readable program code to be executed by one or more processors when retrieved from a non-transitory computer-readable medium, the program code including instructions to:

receiving a pause request from a system user to pause a virtual environment that includes one or more idling virtual machines, each respective virtual machine having a mounting point connected to at least one corresponding block level storage volume;

building a model and a dependency graph of components in the virtual environment in response to receiving the pause request;

storing the model, the dependency graph and a snapshot of each corresponding block level storage volume, which enables resuming the one or more idling virtual machines in the virtual environment;

stopping the components in accordance with dependency logic of the dependency graph; and stopping the one or more idling virtual machines.

9. The computer program product of claim 8, wherein building the dependency graph comprises:

determining a first component in the virtual environment relies on at least one of functionality and data of a second component in the virtual environment;

generating at least a first portion of the dependency logic indicating a restart priority of the second component being restarted before the first component; and generating at least a second portion of the dependency logic indicating a stop priority of the first component being stopped before the second component.

10. The computer program product of claim 8, wherein storing the snapshot of each corresponding block level storage volume comprises:

for each corresponding block level storage volume:
detaching the corresponding block level storage volume from a virtual machine mounting point;
capturing a snapshot of the detached corresponding block level storage volume to back-up a state and data of the block level storage volume;
tagging the captured snapshot;
deleting the detached corresponding block level storage volume; and
storing the tagged snapshot.

11. The computer program product of claim 10, wherein tagging the captured snapshot comprises:

for each snapshot of a corresponding block level storage volume:
generating an identification string to represent a snapshot tag, the identification string indicating an identifier of the corresponding block level storage volume, an identifier of the virtual environment, an identifier of a virtual machine to which the corresponding block level storage volume was connected, and a block device mapping; and
creating an association between the identification string and the captured snapshot.

12. The computer program product of claim 8 further comprising:

receiving a resume request to restart the virtual environment;

building the virtual environment according to the model by instantiating each component with stored component data;

creating one or more block level storage volumes based on the stored snapshots;

restarting the stopped virtual machines associated with the virtual environment;

attaching the created block level storage volumes to mounting points of the restarted virtual machines; and restarting the instantiated components according to the dependency graph.

13. The computer program product of claim 12, wherein creating one or more block level storage volumes based on the stored snapshots comprises:

identifying one or more stored snapshots based on one or more tag queries related to the virtual environment;

accessing one or more stored snapshots identified in search results of the one or more tag queries; and creating the one or more block level storage volumes according to backed-up state and data represented in the one or more accessed stored snapshots.

14. The computer program product of claim 12, further comprising:

wherein the pause request and the resume request are sent by one or more users that have access to the virtual environment and a multi-tenant database system, the virtual environment being hosted by the multi-tenant database system.

15. A system comprising:

one or more processors; and a non-transitory computer readable medium storing a plurality of instructions, which when executed, cause the one or more processors to:

receiving a pause request from a system user to pause a virtual environment that includes one or more idling virtual machines, each respective virtual machine having a mounting point connected to at least one corresponding block level storage volume;

building a model and a dependency graph of components in the virtual environment in response to receiving the pause request;

storing the model, the dependency graph and a snapshot of each corresponding block level storage volume, which enables resuming the one or more idling virtual machines in the virtual environment;

stopping the components in accordance with dependency logic of the dependency graph; and stopping the one or more idling virtual machines.

16. The system of claim 15, wherein building the dependency graph comprises:

determining a first component in the virtual environment relies on at least one of functionality and data of a second component in the virtual environment;

generating at least a first portion of the dependency logic indicating a restart priority of the second component being restarted before the first component; and generating at least a second portion of the dependency logic indicating a stop priority of the first component being stopped before the second component.

17. The system of claim 15, wherein storing the snapshot of each corresponding block level storage volume comprises:

for each corresponding block level storage volume:
detaching the corresponding block level storage volume from a virtual machine mounting point;
capturing a snapshot of the detached block level storage volume to back-up a state and data of the block level storage volume;
tagging the captured snapshot;
deleting the detached block level storage volume; and
storing the tagged snapshot.

18. The system of claim 17, wherein tagging the captured snapshot comprises:

for each snapshot of a corresponding block level storage volume:
generating an identification string to represent a snapshot tag, the identification string indicating an identifier of the corresponding block level storage volume, an identifier of the virtual environment, an identifier of a virtual machine to which the corresponding block level storage volume was connected, and a block device mapping; and creating an association between the identification string and the captured snapshot.

19. The system of claim 15, further comprising:

receiving a resume request to restart the virtual environment;

building the virtual environment according to the model by instantiating each component with stored component data;

creating one or more block level storage volumes based on the stored snapshots;

restarting the stopped virtual machines associated with the virtual environment;

attaching the created block level storage volumes to mounting points of the restarted virtual machines; and restarting the instantiated components according to the dependency graph.

20. The system of claim 19, wherein creating one or more block level storage volumes based on the stored snapshots comprises:

identifying one or more stored snapshots based on one or more tag queries related to the virtual environment;

accessing one or more stored snapshots identified in search results of the one or more tag queries; and creating the one or more block level storage volumes according to backed-up state and data represented in the one or more accessed stored snapshots.

* * * * *